Nov. 6, 1956 R. G. HUNT ET AL 2,769,191

PLUMBER'S TOOL

Filed Jan. 22, 1954

INVENTORS
ROBERT G. HUNT
WALTER W. HUNT
BY

*Mann & Graham*

ATTORNEYS

United States Patent Office 2,769,191
Patented Nov. 6, 1956

2,769,191

PLUMBER'S TOOL

Robert G. Hunt and Walter W. Hunt, Los Angeles, Calif., assignors to Marco Products Company, Los Angeles, Calif., a copartnership Application January 22, 1954, Serial No. 405,592

5 Claims. (Cl. 15—104.3)

This invention has to do with plumbers' pipe cleaning tools and particularly with devices for housing, gripping and rotating plumbers' snakes.

Plumbers' snakes in the form of long, thin, wire or wire-like members are commonly used for removing obstructions in pipes by feeding the snake into the pipe and rotating it. For convenience in handling and storing the snakes, devices are provided which house the portion of the snake not in use and afford means for gripping the snake so that it can be readily urged forward to advance it.

An object of this invention is to provide a device for housing and rotating a plumber's snake of a type capable of being coiled, having novel means for releasably gripping the snake.

A particular object of the invention is to provide, in such a device, a novel construction whereby a snake can be firmly gripped so that it may be urged forward irrespective of whether it is being rotated at the time.

Another object is to provide novel means, in a device of the type indicated, for releasably gripping the snake which permits the snake and the housing therefor to be rotated as a unit and affords a readily usable handle for operating the device.

A further object is to provide means of the type indicated which is durable and easy to operate.

A further object is to provide gripping means, in a device of the type indicated, which can be readily manufactured, assembled and disassembled.

These and other objects will be apparent from the drawing and the following description.

Referring to the drawing.

Figure 1:
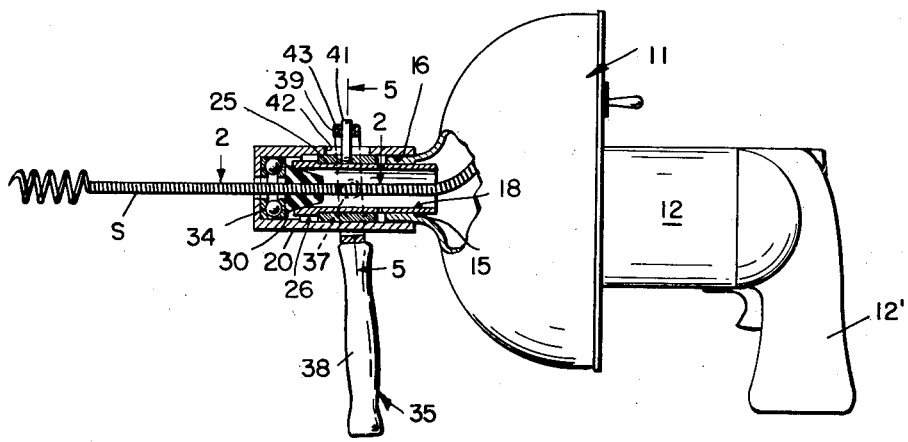
Fig. 1 is a side elevational view, partly in section, illustrating a device embodying the invention.
Figure 2:
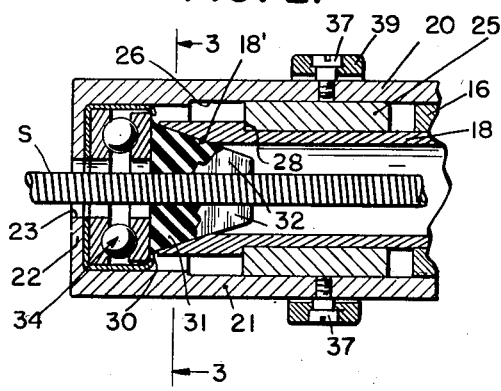
Fig. 2 is an enlarged fragmentary sectional view on line 2—2 of Fig. 1 showing the parts in snake-gripping relation.

More particularly describing the invention, numeral 11 generally indicates a housing in which may be coiled a plumber's snake S, shown as a tightly coiled spring wire. The casing 11 has mounted thereon an electric motor 12 which is used for rotating the casing and a snake therein in operation of the device, as will later be described. The casing 11 and the housing for the motor 12 are mounted in a conventional manner to permit relative rotation.

The casing is shown as provided with an opening 15 which is concentric with the axis of rotation of the casing member and this opening is defined by a tubular extension 16 projecting from the main portion of the casing.

A tubular spindle or sleeve 18 is securely fixedly mounted within the tubular extension 16 so that it may be considered to be a further extension of the casing. The spindle 18 is received within a chuck body housing 20 which includes a cylindrical portion 21 and an annular end wall 22. The latter defines an opening 23 through which the snake passes. Between the cylindrical portion 21 of the chuck body housing and the spindle 18 we provide an axially movable collar 25 which rotatably receives the member 18. The collar is slidably mounted in a counterbore portion 26 in the chuck body housing. The forward end of the collar is adapted to bear against an annular shoulder 28 formed on the periphery of spindle 18.

Figure 4:
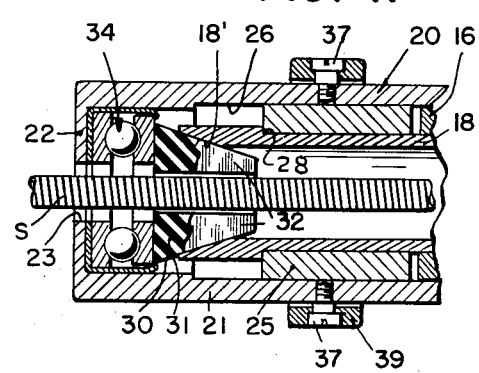
Fig. 4 is a view similar to Fig. 2 but showing the parts in the normal or released position.
Figures 3, 5:
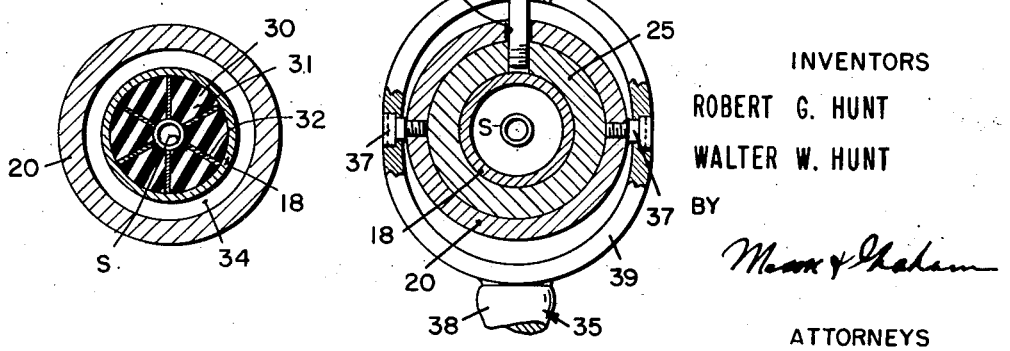
Fig. 3 is a sectional view on line 3—3 of Fig. 2.
Fig. 5 is an enlarged sectional view on line 5—5 of Fig. 1.

The forward end of member 18 has a tapered seat 18' which is adapted to receive a special chuck collet 30 having a resilient body 31 formed of rubber or the like with steel jaw inserts 32 therein. The chuck collet is shaped to project into the member 18 a substantial distance when in normal position, as shown in Fig. 4. The forward end of the chuck collet bears against a thrust bearing 34 mounted in the forward end of the chuck body housing.

For the purpose of contracting the chuck collet into gripping engagement with the snake S which passes therethrough, we provide an actuating lever 35 which is pivotally mounted on the body 20, as by means of screws 37. The lever includes a handle portion 38 and a circular chuck body housing encircling portion 39. A leverage pin 41, which is threadedly mounted in the operating collar 25, extends through a slot 42 provided in member 20 and through a relatively large opening 43 in the lever. With this construction it will be apparent that pivotal movement of the handle toward the casing 11 will move the body 20 and hence collet 30 toward casing 11, camming the chuck collet into gripping engagement with the snake.

If desired, the parts can be disassembled by removing the leverage pin 41, permitting replacement of the chuck collet.

In using the device, it will be apparent from the construction described that the snake can be readily gripped at will by an operator who can hold the device by grasping the handle 38 in one hand and the pistol grip 12' of the motor in the other. Slight pressure on the handle 38 of lever 35 serves to cause the chuck collet to firmly grip the snake to enable an operator to urge it forward into the pipe. Also the snake can be rotated while gripped.

Although we have illustrated and described a preferred form of our invention, we contemplate that various changes and modifications can be made without departing from the invention, the scope of which is indicated by the following claims.

We claim:

1. In a plumber's snake device, a snake housing in which a plumber's snake can be coiled, said housing having an opening at one side for the passage of the snake, a tubular spindle projecting from said housing axially of said opening, a tubular chuck body housing surrounding said spindle, a thrust bearing mounted in the outer end of said chuck body housing beyond the end of said spindle, a collet chuck between said bearing and said spindle, said spindle and collet chuck having interengaging wedge faces whereby to contract said chuck upon relative movement toward each other of said bearing and said spindle, and interengaging means between said chuck body housing and said spindle for moving the same axially relative to each other, said interengaging means including a manually operable member carried by said chuck body housing, said chuck body housing and said spindle being relatively rotatable.

2. In a plumber's snake device, a snake housing in which a plumber's snake can be coiled, said housing having an opening at one side for the passage of the snake, a tubular spindle projecting from said housing axially of said opening, a tubular chuck body housing surrounding said spindle, a thrust bearing mounted in the outer end of said chuck body housing, a collet chuck between said bearing and said spindle, said spindle and collet chuck having interengaging wedge faces whereby to contract said chuck upon relative movement toward each other of said bearing and said spindle, a lever mounted on said chuck body housing for pivotal movement about an axis normal to the longitudinal axis of said spindle, a collar on said spindle, interengaging means on said collar and said spindle preventing movement of said spindle relative to said collar in a direction away from said chuck collet, a leverage pin mounted in said collar and projecting radially therefrom, said chuck body housing having a slot receiving said pin, said pin being operatively connected to said lever at its outer end.

3. A device as set forth in claim 2 in which said leverage pin is removably mounted in said collar and serves to releasably retain said chuck body housing.

4. In a device for gripping an elongated object extending therethrough, a tubular spindle, a collar on said spindle, a tubular chuck body housing surrounding said collar and said spindle, said spindle having a tapered seat at one end, a chuck collet at least partially received in said seat, a thrust bearing in said chuck body housing beyond said chuck collet, a lever mounted on said chuck body housing for pivotal movement about an axis normal to the longitudinal axis of said spindle, a leverage pin mounted in said collar and projecting radially therefrom, said chuck body housing having a slot receiving said pin, said pin being operatively connected to said lever at its outer end.

5. In a plumber's snake device, a snake housing in which a snake can be coiled, said housing having an opening at one side for the passage of the snake, a tubular spindle projecting from said housing axially of said opening and fixed to said housing, a collar on said spindle, said spindle having an abutment shoulder engageable by the outer end of said collar, a tubular chuck body housing surrounding said collar and spindle, said spindle having a tapered seat at one end, a thrust bearing mounted in the outer end of said chuck body housing, a collet chuck between said bearing and said spindle received in said seat, a lever mounted on said chuck body housing for pivotal movement about an axis normal to the longitudinal axis of said spindle, a leverage pin mounted in said collar and projecting radially therefrom through said chuck body housing, said chuck body housing having a slot receiving said pin, said pin being operatively connected to said lever at its outer end.

References Cited in the file of this patent

UNITED STATES PATENTS

| | | |
|---|---|---|
| 2,346,706 | Stoner | Apr. 18, 1944 |
| 2,470,225 | Silverman | May 17, 1949 |
| 2,460,149 | Schoensiegel | Jan. 25, 1949 |
| 2,600,707 | Turnbaugh | June 17, 1952 |
| 2,661,489 | Rudolph et al. | Dec. 8, 1953 |